United States Patent
Ogo et al.

(10) Patent No.: US 7,901,312 B2
(45) Date of Patent: Mar. 8, 2011

(54) SILENT CHAIN TRANSMISSION DEVICE

(75) Inventors: Toshitaka Ogo, Osaka (JP); Kenichi Nagao, Osaka (JP); Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 441 days.

(21) Appl. No.: 12/108,895

(22) Filed: Apr. 24, 2008

(65) Prior Publication Data

US 2008/0312019 A1 Dec. 18, 2008

(30) Foreign Application Priority Data

Jun. 12, 2007 (JP) .................................. 2007-154814

(51) Int. Cl.
*F16G 13/04* (2006.01)

(52) U.S. Cl. ......................................... 474/212; 474/213

(58) Field of Classification Search .................. 474/206, 474/212, 213
See application file for complete search history.

(56) References Cited

U.S. PATENT DOCUMENTS

| | | | | |
|---|---|---|---|---|
| 3,377,875 A | * | 4/1968 | Sand | 474/94 |
| 4,168,634 A | * | 9/1979 | Griffel | 474/148 |
| 5,690,571 A | * | 11/1997 | Mott | 474/212 |
| 6,663,522 B2 | | 12/2003 | Horie | |
| 7,442,139 B2 | * | 10/2008 | Kubo et al. | 474/152 |

FOREIGN PATENT DOCUMENTS

| | | |
|---|---|---|
| GB | 2436359 | 9/2007 |
| JP | 55024203 | 2/1980 |
| JP | 60-131742 | 9/1985 |
| JP | 2002-250406 | 9/2002 |

* cited by examiner

*Primary Examiner* — Sang Kim
(74) *Attorney, Agent, or Firm* — Howson & Howson LLP (57) ABSTRACT

In a silent chain transmission, a silent chain composed of uniform link plates meshes with a sprocket having two or three kinds of teeth randomly distributed around its circumference. The teeth have a common tooth gap bottom diameter, and a uniform angular spacing, but have different heights and different tooth forms.

4 Claims, 10 Drawing Sheets

SILENT CHAIN TRANSMISSION DEVICE

CROSS REFERENCE TO RELATED APPLICATION

This application claims priority on the basis of Japanese patent application 2007-154814, filed Jun. 12, 2007. The disclosure of Japanese application 2007-154814 is hereby incorporated by reference.

FIELD OF THE INVENTION

The invention relates to a silent chain transmission of the kind used for transmitting power in automobile engines and industrial machines.

BACKGROUND OF THE INVENTION

Silent chains are widely used as timing chains in automobile engines, for transmitting power from the engine crankshaft to one or more valve-operating camshafts. The silent chain is composed of link plates each having a pair of teeth, and in this application, power is transmitted by engagement of either the inner flanks or the outer flanks of the teeth of the link plates with sprocket teeth.

In a conventional silent chain transmission, the tooth form of the link teeth is uniform, as is the tooth form of the sprocket teeth. However, in a conventional silent chain transmission, engagement sounds are generated when pairs of link teeth of the link plates engage with tooth surfaces of the sprocket teeth. Repetition of substantially the same noises causes resonant vibration of the engine at certain engine speeds, and results in an increased noise level.

Various measures have been taken to decrease the noise generated by a silent chain transmission. For example, in a silent chain transmission described in U.S. Pat. No. 6,663,522, a random arrangement type silent chain is utilized, in which first link plates, which seat on a sprocket tooth by engagement of their inner flanks with the sprocket tooth, and second link plates, which seat on a sprocket tooth with their outer flanks engaged with the sprocket tooth, are disposed in a random arrangement along the length of the chain. The mixing ratio of the first link plates to all the link plates is 50% or less, and at least one or more of the second link plates is disposed at front and rear positions relative to each first link plate.

However, since the random arrangement type silent chain disclosed in U.S. Pat. No. 6,663,522 uses first link plate and second link plates having different shapes, manufacture and assembly of the chain is costly and disadvantageous.

An object of the invention is to provide a less expensive silent chain transmission, which exhibits reduced engagement noise.

SUMMARY OF THE INVENTION

The silent chain transmission according to the invention comprises an endless silent chain and at least two sprockets. The chain is composed of interleaved widthwise rows of link plates, each link plate having a pair of link teeth, each link tooth having an inner flank and an outer flank, and a pair of pin holes, and connecting pins extending through the pin holes and connecting the interleaved rows of link plates whereby the link plates of each row are pivotable relative to the link plates of an adjacent row interleaved therewith. At least one of the sprockets has a plurality of sprocket teeth. The link teeth of the link plates in each of said rows are seatable on the sprocket teeth with their inner flanks engaged with a sprocket tooth, with their outer flanks engaged respectively with different sprocket teeth, or with their inner flanks engaged with a sprocket tooth and with the outer flanks engaged respectively with different sprocket teeth. The link plates are initially engageable with the sprocket by engagement of inner flanks with a sprocket tooth. The link plates of each link row of the chain have the same shape, and the teeth of the sprocket are disposed at equal angles in a circumferential direction and comprise at least two kinds of teeth having different tooth forms. The tooth gap bottoms of the sprocket are disposed on a common tooth gap bottom circle, the heights of the teeth of each of said at least two kinds of teeth are different from the heights of the teeth of each of the other of said at least two kinds of teeth, and the shapes of the tooth surfaces of the teeth of each of said at least two kinds of teeth are different from the shapes of the tooth surfaces of the teeth of each of the other of said at least two kinds of teeth.

In some cases, there is a transfer from inner flank contact at initial engagement of the chain with the sprocket, to outer flank contact for seating. When the contact of the link plate with a tooth surface of a sprocket tooth shifts from the inner flank to the outer flank, the timing of the transfer of contact is shifted because of the two or more different kinds of sprocket teeth, and noises at the time of teeth engagement can be reduced. A similar noise-reducing effect is achieved by irregular engagement timing even in the case where there is no transfer from inner flank contact at initial engagement to outer flank contact for seating. Furthermore, since the sprocket comprises two or more kinds of teeth having different tooth forms, costs can be reduced in comparison with the cost of a silent chain transmission in which engagement timing is made irregular by providing two or more kinds of link plates in the chain, as in the prior art.

Further, when the silent chain transmission according to the invention is used an automobile timing transmission, since natural frequencies of vibration of engines vary, a predetermined sprocket tooth shape is not necessarily optimum. Tuning can be improved, and resonant effects avoided, by changing the tooth forms of two or more kinds of teeth of a sprocket, and changing the order of the two or more kinds of teeth. This can be accomplished easily for a given engine by selection of an appropriate set of sprockets.

DETAILED DESCRIPTION OF THE PREFERRED EMBODIMENTS

Figure 1:
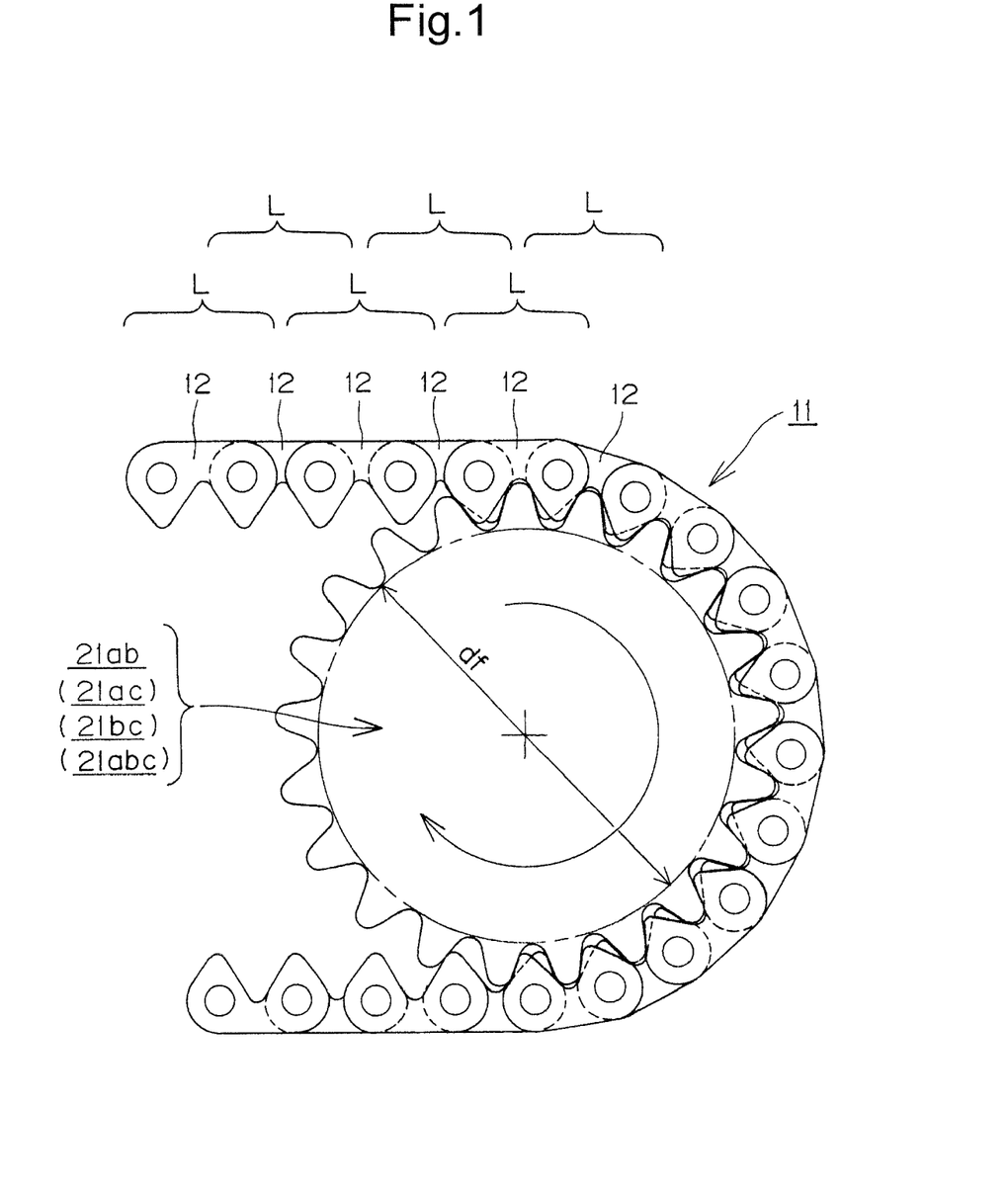
FIG. 1 is a schematic view showing a part of a silent chain transmission device according to the invention.
Figure 2:
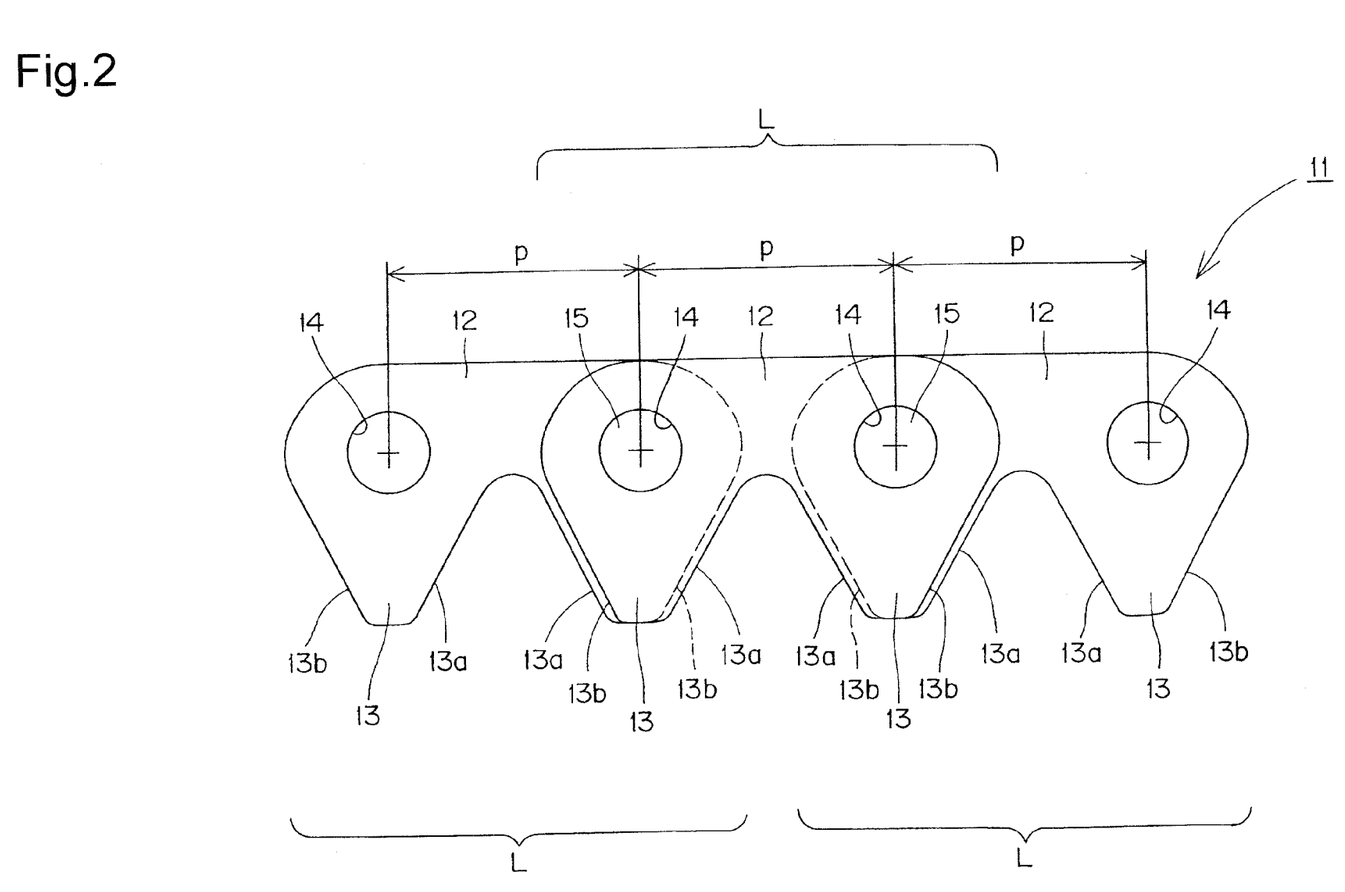
FIG. 2 is an elevational view showing a part of the silent chain of FIG. 1.

As shown in FIGS. 1 and 2, in the silent chain transmission of the invention, an endless silent chain 11 is formed by flexibly connecting link rows L by connecting pins 15. Each link row L extends in the direction of the width of the chain, and comprises a plurality of parallel link plates 12. Each link plate 12 has a pair of link teeth 13 and a pair of pin holes 14. The transmission also comprises a sprocket having a plurality of teeth, which engage with the link teeth 13.

As shown in FIG. 2, each link tooth 13 has an inner flank 13a and an outer flank 13b. The silent chain 11 can be designed to seat on a sprocket by engagement of its inner flanks 13a with a sprocket tooth or by engagement of its outer flanks 13b engaged respectively with two different sprocket teeth separated from each other by an intermediate sprocket tooth that extends into the space between the link teeth without touching the link teeth. It is also possible for the chain to seat on a sprocket with both the inner and outer flanks of its teeth engaged with sprocket teeth. When the chain is seated in one of these ways, power can be transmitted by the chain to the sprocket, or by the sprocket to the chain. Regardless of the final seating arrangement, the initial engagement of the chain with the sprocket begins with engagement of an inner flank 13a of the chain with a sprocket tooth.

In each link row L of the chain, all of the link plates 12 have the same shape. Preferably, all of the links in the chain have the same shape.

As indicated in FIG. 1, four different kinds of sprockets will be described: a sprocket 21ab, having two different kinds of teeth A and B; a sprocket 21ac, having two different kinds of teeth A and C; a sprocket 21bc, having two different kinds of teeth B and C; and a sprocket 21abc, having three different kinds of teeth A, B, and C. In each case, the teeth of the sprocket 21ab are arranged at a uniform circumferential spacing, so that the angular distance between adjacent teeth, i.e., the angular distance between corresponding parts of the adjacent teeth, is uniform.

Figure 3:
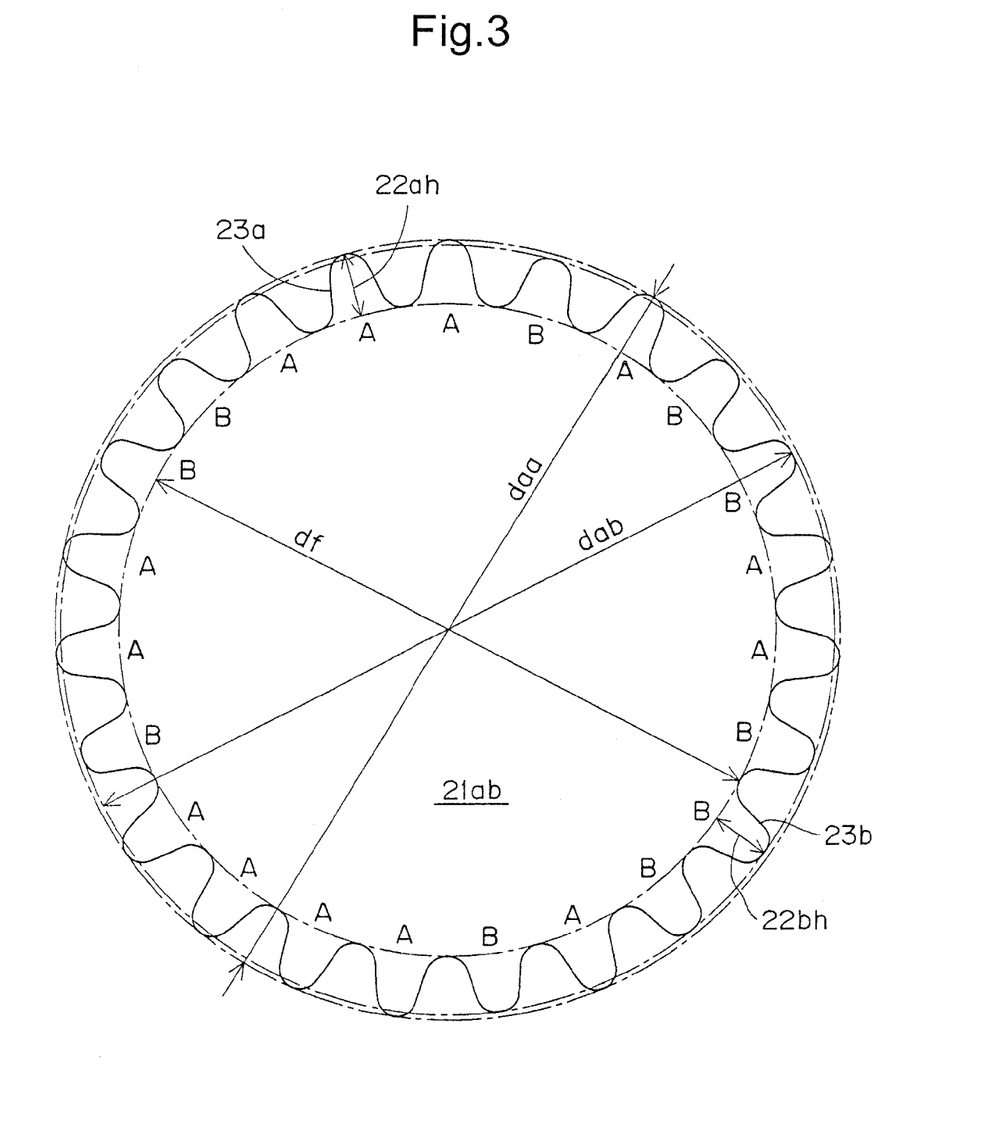
FIG. 3 is an elevational view of a sprocket in accordance with a first embodiment of the invention.

In the case of sprocket 21ab, as shown in FIG. 3, the sprocket has teeth A and B. Teeth A have the same tooth form and tooth heights, as do teeth B. However, the tooth form of teeth A is different from the tooth form of teeth B. The sprocket has a common tooth gap bottom diameter df. The heights 22ah and 22bh of the respective teeth A and B are different, and the shapes of the respective tooth surfaces 23a and 23b are different from each other.

As shown in FIG. 2, the link plate 12 forming each link L has a pair of link teeth 13 and a pair of link holes 14 and each link tooth 13 is formed of a plane inner flank 13a and a plane outer flank 13b. When the silent chain 11 is stretched in a straight line in the longitudinal direction, the inner flanks 13a the teeth 13 protrude slightly beyond the outer flanks 13b of the teeth in the adjacent, overlapping, link row.

The chain 11 has a uniform chain pitch p, i.e., a uniform interval between the centers of the connecting pins 15. Since the link plates 12 all have the same shape, the interval between corresponding inner flanks 13a in successive rows, and the interval between corresponding outer flanks 13b in successive rows are both equal to the chain pitch p.

As shown in FIG. 3, a sprocket 21ab has two kinds of teeth, A and B, for engagement teeth 13 of the silent chain 11. The teeth are uniformly positioned about the circumference of the sprocket. That is, the angle between radial centerlines for each pair of successive teeth of the sprocket is uniform.

Teeth A and B have different heights and different tooth forms. Tooth A has a height 22ah, and a tooth surface 23a in the form of an involute curve. Tooth B has a height 22bh of tooth and a tooth surface 23b in the form of a different involute curve. The tooth height 22ah of the tooth A is slightly larger than the tooth height 22bh of the tooth B. That is, 22ah>22bh.

The teeth A and B are formed with a common tooth gap bottom diameter (root diameter) df. Thus, as seen in FIG. 3, the diameter daa of the tooth head circle of teeth A can be expressed as the sum of the common tooth gap bottom diameter df and twice the height 22ah of a tooth A. That is, daa=df+22ah×2. Likewise, the diameter dab of the tooth head circle of teeth B can be expressed as the sum of the common tooth gap bottom diameter df and the twice the tooth height 22bh of a tooth B. That is, dab=df+22bh×2. Therefore, as shown in FIG. 3, the diameter daa of the tooth head circle of teeth A is slightly larger than the diameter dab of the tooth head circle of teeth B. That is, daa>dab.

As mentioned previously, the shape of the tooth surfaces 23a and the shape of the tooth surfaces 23b are different from each other. In the manufacture of the sprocket, as a first step all the teeth are formed by a hob as large teeth A, having a tooth head diameter daa. Then, some, but not all, of the teeth A formed by the hob are milled by a milling machine to form a desired number of teeth B. The outer shape of the milling cutter used to form teeth B is different from the outer shape the cutting surface of the hob used in forming teeth A. As a result, the heights 22ah and 22bh of the respective teeth A and B are different, as are the shapes of the tooth surfaces 23a and 23b, and the sprocket has a two different kinds of teeth A and B, which can be randomly distributed about the circumference of the sprocket, as shown in FIG. 3.

By using different hobs and different milling cutters, the tooth forms of the two kinds of teeth A and B can be changed. The arrangement of the two kinds of teeth A and B can also be changed, and the arrangement shown in FIG. 3 is one example of numerous possible arrangements of teeth A and B.

Figure 4:
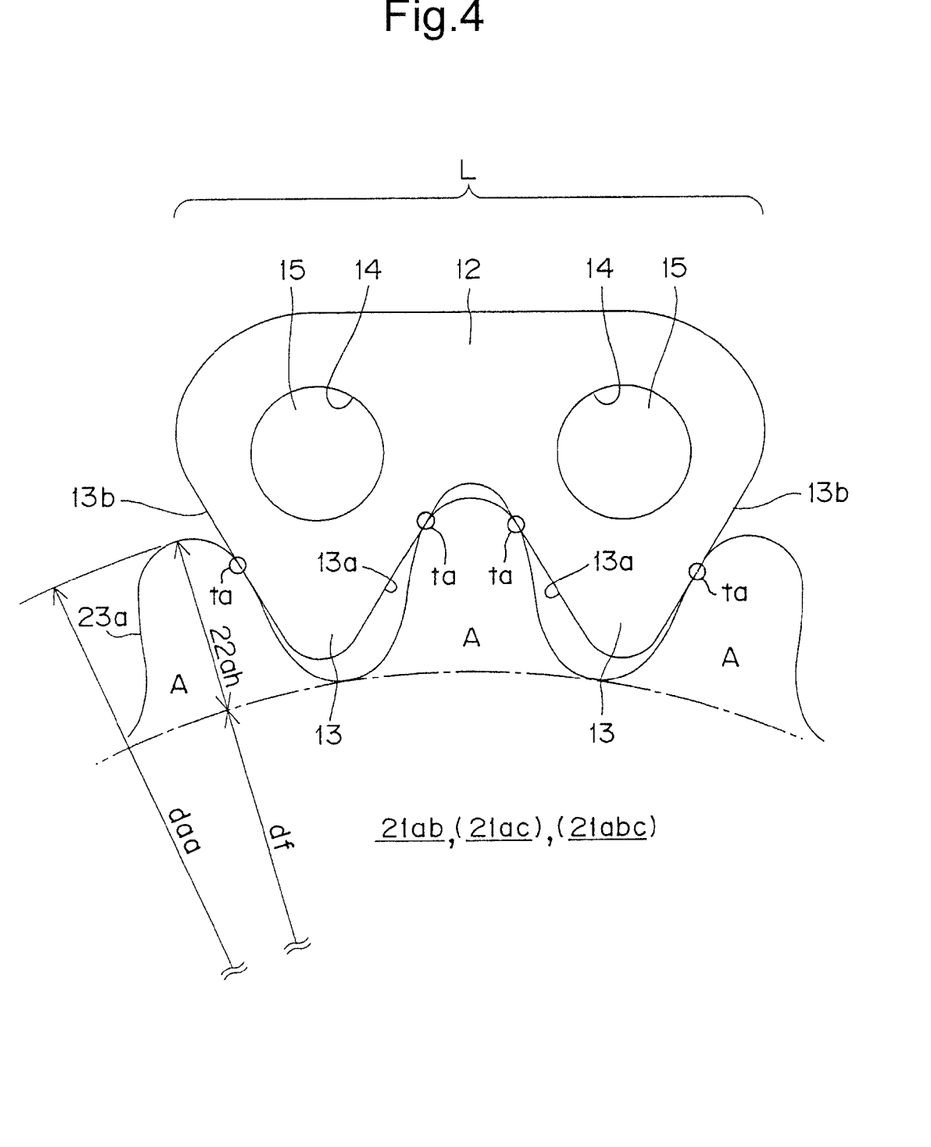
FIG. 4 is an enlarged schematic view a first variation of a seating relationship of a link plate on a sprocket tooth in the embodiment of FIG. 3.
Figure 5:
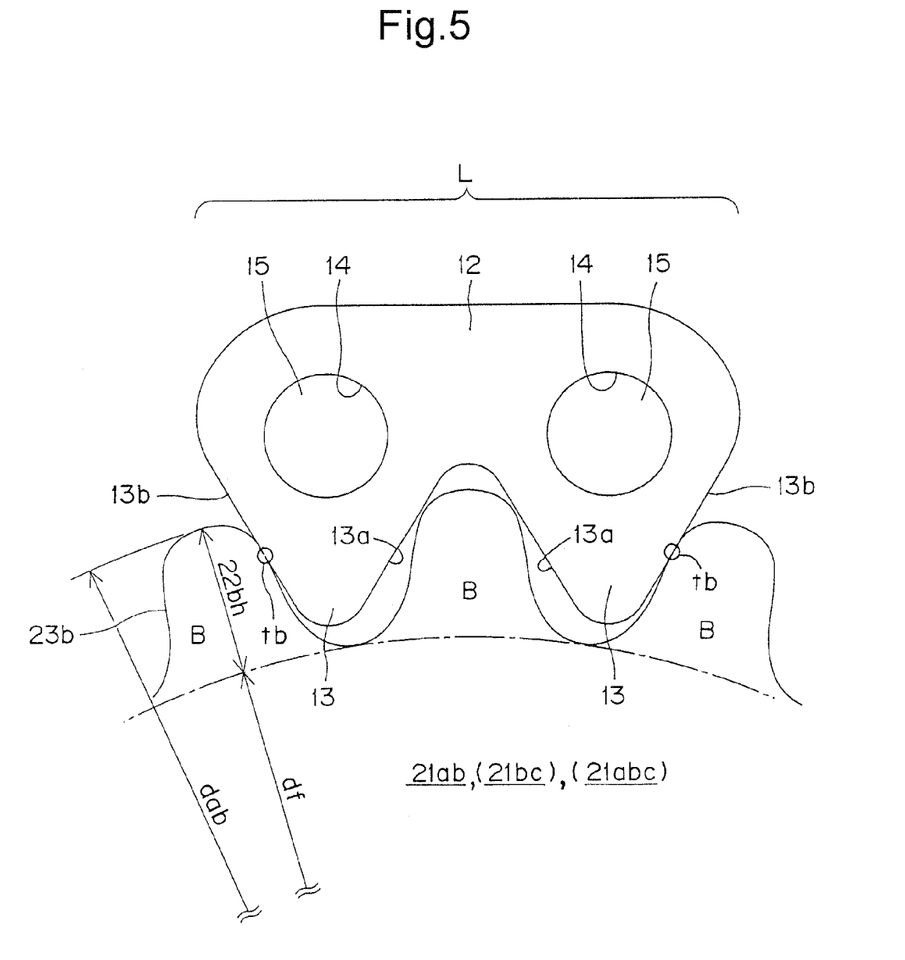
FIG. 5 is an enlarged schematic view of a second variation of a seating relationship of a link plate on a sprocket tooth in the embodiment of FIG. 3.

When the sprocket 21ab is rotated clockwise, the silent chain 11 starts engagement with the sprocket by engagement of inner flanks 13a (FIG. 2) of the chain teeth with teeth A and B of the sprocket. As the chain moves around the sprocket, the chain becomes seated on the sprocket teeth with the inner flanks and outer flanks, or the outer flanks only, in contact with the sprocket teeth. As shown in FIG. 4, on a tooth A of the sprocket 21ab, the inner flanks 13a and the outer flanks 13b of the chain teeth are simultaneously seated at four seating points ta. As shown in FIG. 5, on a tooth B only the outer flanks 13b are seated, at two seating points ta. Since the sprocket has two kinds of teeth A and B, with different tooth forms and different tooth heights, transfer from inner flank contact to outer flank contact occurs at different times for sprocket teeth A and B, and, as a result, noises at the time of seating engagement are reduced.

Further, as shown in FIG. 4, since the inner flanks 13a and the outer flanks 13b are simultaneously seated on the four seating points ta, seating loads are dispersed, stress is reduced, and the seating impact force is reduced, thereby reducing the noise level.

Since the sprocket has two kinds of teeth A and B, having different tooth forms, the overall cost of the transmission can be lower than that of a silent chain transmission in which engagement timing is made irregular by providing two or more kinds of link plates in the chain, as in the prior art.

Automobile engines have different natural frequencies, and resonance may occur when certain chains are used to drive the camshaft of the engine from the engine crankshaft. When the silent chain transmission device according to the invention is used as a timing chain in an automobile engine, the different natural frequencies of different engines can be easily accommodated by changing the tooth forms of teeth A and B and changing the order of teeth A and B, thereby avoiding the effects of resonance.

Figure 6:
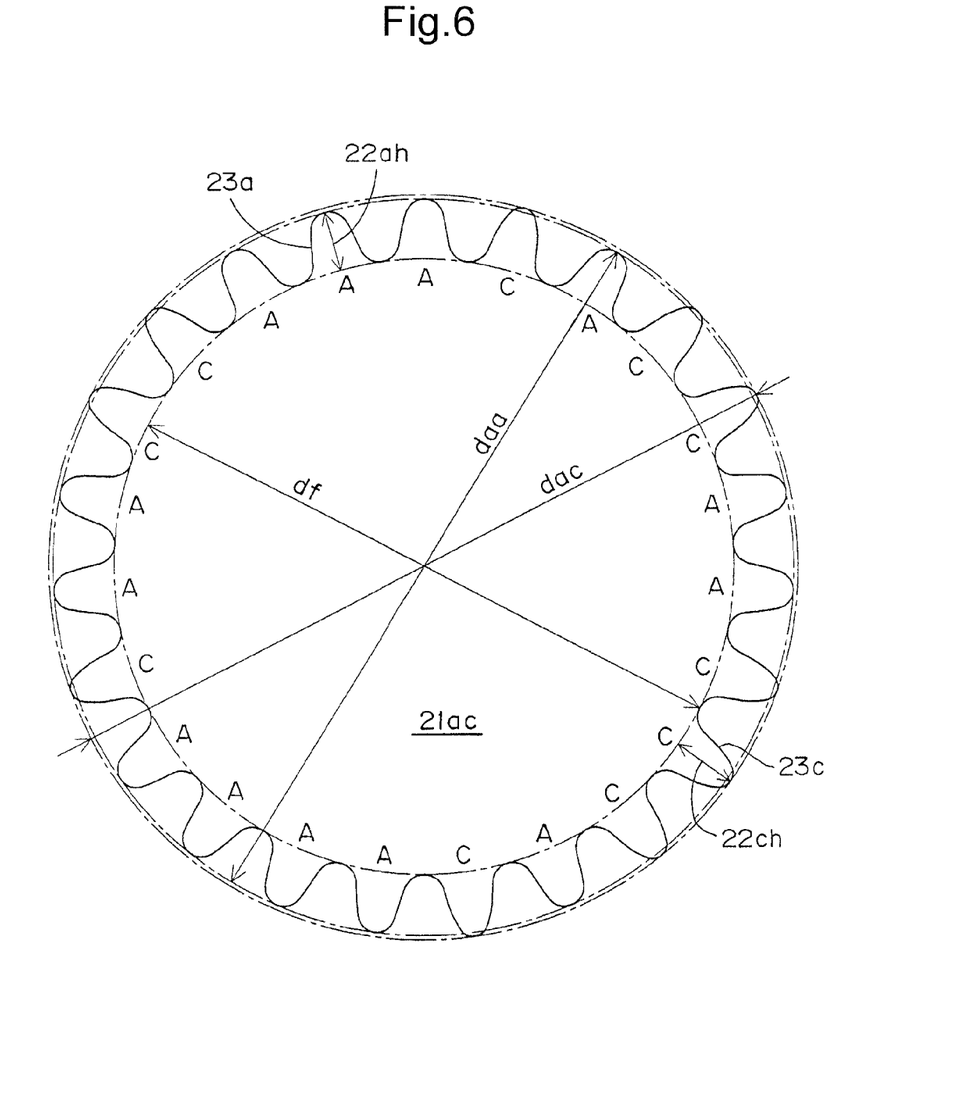
FIG. 6 is an elevational view of a sprocket in accordance with a second embodiment of the invention.
Figure 7:
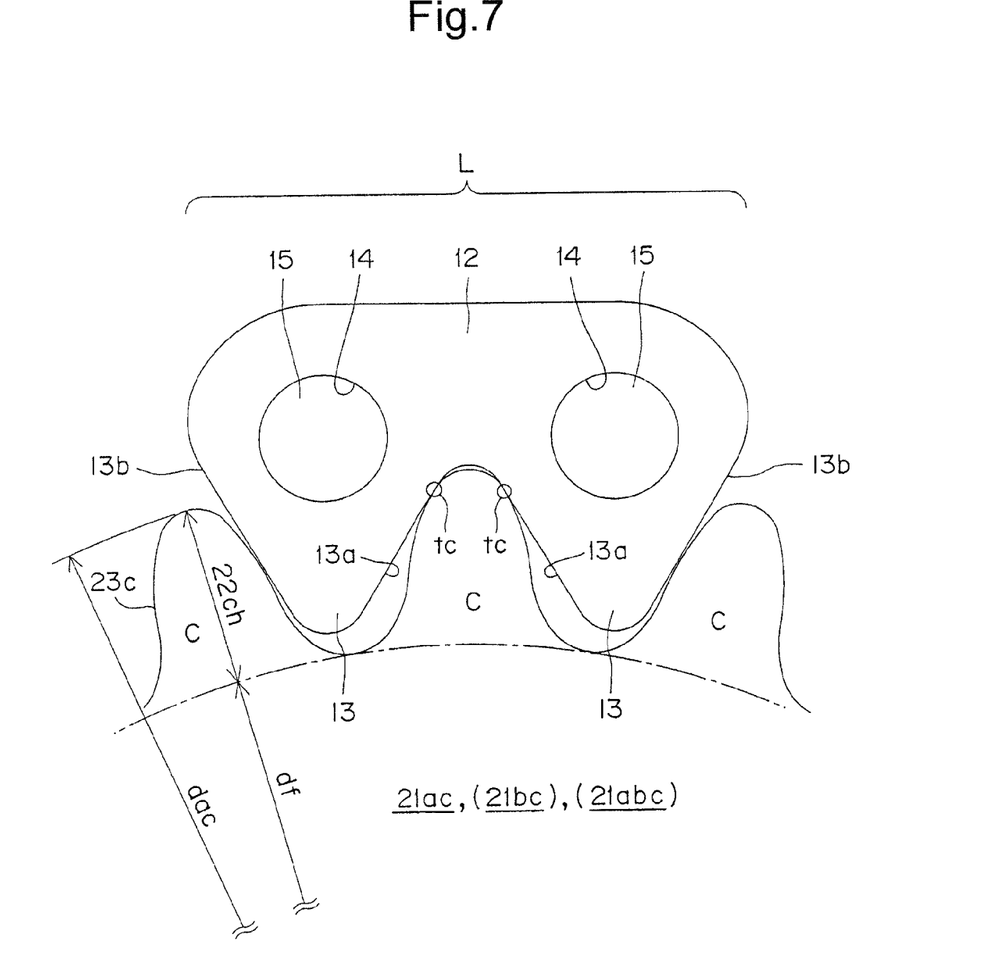
FIG. 7 is an enlarged schematic view of a seating relationship of a link plate on a sprocket tooth in the embodiment of FIG. 6.

In the embodiment of the invention shown in FIGS. 6 and 7, the silent chain can be the same chain as used in the first embodiment. As shown in FIG. 6, the sprocket 21ac has a plurality of teeth, which engage with the link teeth 13 of the silent chain 11 shown in FIG. 2. The teeth of the sprocket consist of teeth A and C, which are uniformly positioned about the circumference of the sprocket so that the angle between radial centerlines for each pair of successive teeth of the sprocket is uniform.

Teeth A have a height 22ah and tooth surfaces 23a, having the shape of an involute curve. Teeth C have a height 22ch of tooth and tooth surfaces 23c also having the shape of an involute curve.

The height 22ch of the teeth C is slightly greater than the height 22ah of the teeth A. That is, 22ch>22ah.

The teeth A and C are formed with a common tooth gap bottom diameter (root diameter) df. Thus, as seen in FIG. 6, the diameter daa of the tooth head circle of teeth A can be expressed as the sum of the common tooth gap bottom diameter df and twice the height 22ah of a tooth A. That is, daa=df+22ah×2. Likewise, the diameter dac of the tooth head circle of teeth C can be expressed as the sum of the common tooth gap bottom diameter df and the twice the tooth height 22ch of teeth C. That is, dac=df+22ch×2.

As shown in FIG. 6, the diameter dac of the tooth head circle of teeth C is slightly larger than the diameter daa of the tooth head circle of teeth A. That is, dac>daa.

The shape of the tooth surface 23a and the shape of the tooth surface 23c are also different from each other.

In the manufacture of the sprocket, as a first step all the teeth are formed by a hob as large teeth C, having a tooth head diameter dac. Then, some, but not all, of the teeth C formed by the hob are milled by a milling machine to form a desired number of teeth A. The outer shape of the milling cutter used to form teeth A is different from the outer shape the cutting surface of the hob used in forming teeth C. As a result, the heights 22ah and 22ch of the respective teeth A and C are different, as are the shapes of the tooth surfaces 23a and 23c, and the sprocket has a two different kinds of teeth A and C, which can be randomly distributed about the circumference of the sprocket, as shown in FIG. 6.

By using different hobs and different milling cutters, the tooth forms of the two kinds of teeth A and C can be changed. The arrangement of the two kinds of teeth A and C can also be changed, and the arrangement shown in FIG. 6 is one example of numerous possible arrangements of teeth A and C.

When the sprocket 21ac is rotated clockwise, the silent chain 11 starts engagement with the sprocket by engagement of inner flanks 13a (FIG. 2) of the chain teeth with teeth A and C of the sprocket. As the chain moves around the sprocket, the chain becomes seated on the sprocket teeth with the inner flanks and outer flanks, or the inner flanks only, in contact with the sprocket teeth. On a series of sprocket teeth A, the inner flanks 13a and the outer flanks 13b of the teeth of a link plate can be seated at four seating points ta, as shown in FIG. 4. On a series of sprocket teeth C only the inner flanks of the link plate become seated, at two seating points tc, as shown in FIG. 7. Since the sprocket has two kinds of teeth A and C, with different tooth forms and different tooth heights, seating contact between the trailing inner flanks and the sprocket teeth occurs at different times for sprocket teeth A and C, and, as a result of the shift in seating timing, noises occurring on seating engagement are reduced.

Further, as shown in FIG. 4, since the inner flanks 13a and the outer flanks 13b are simultaneously seated on the four seating points ta, seating loads are dispersed, stress is reduced, and the seating impact force is reduced, thereby reducing the noise level.

As in the case of the first embodiment, since the sprocket 21ac of the second embodiment has two kinds of teeth A and C, having different tooth forms, the overall cost of the transmission can be lower than that of a silent chain transmission in which engagement timing is made irregular by providing two or more kinds of link plates in the chain, as in the prior art.

When the silent chain transmission device according to the second embodiment is used as a timing chain in an automobile engine, the different natural frequencies of different engines can be easily accommodated by changing the tooth forms of teeth A and C and changing the order of teeth A and C, thereby avoiding the effects of resonance.

Figure 8:
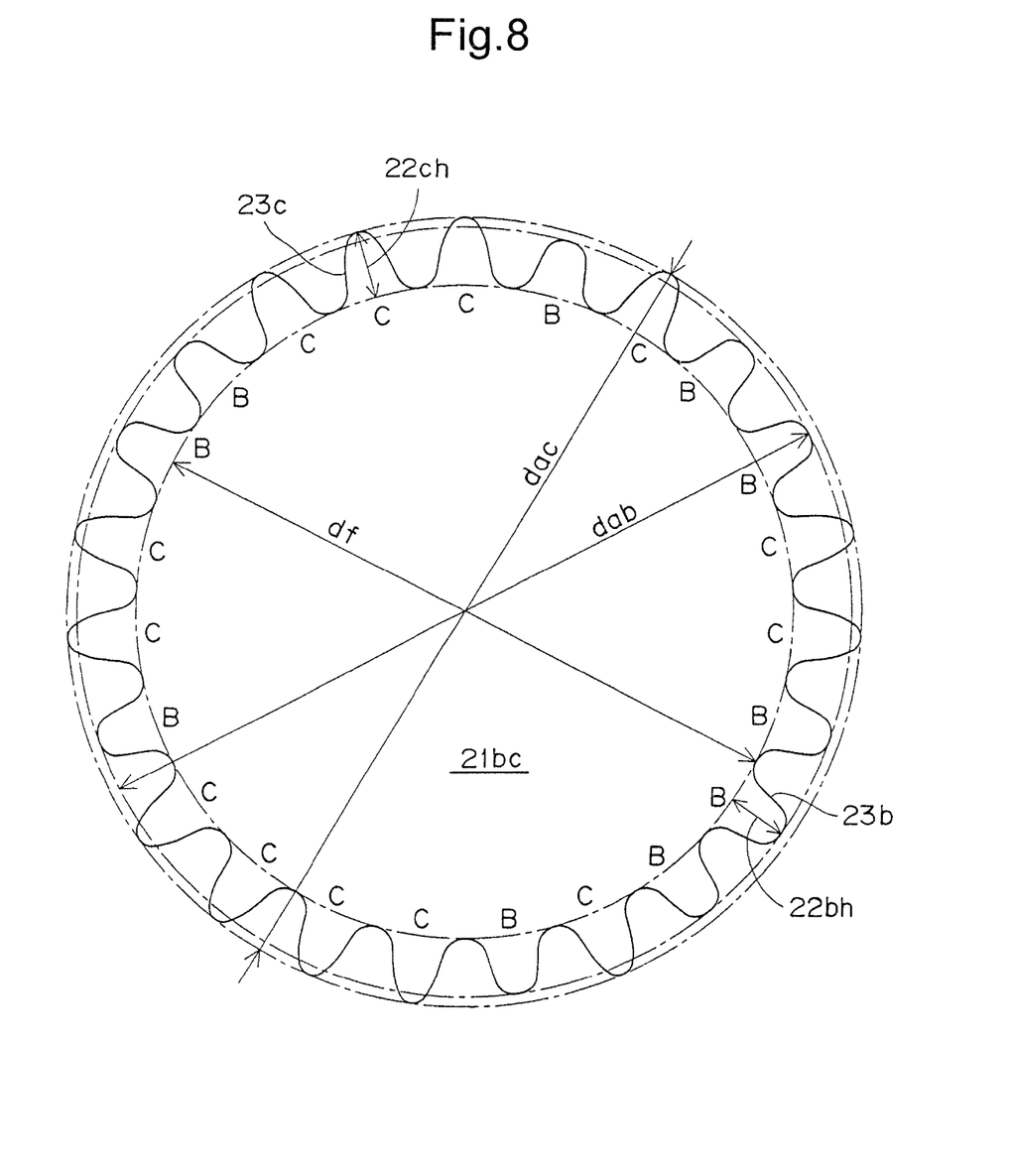
FIG. 8 is an elevational view of a sprocket in accordance with a third embodiment of the invention.

In the third embodiment of the invention shown in FIG. 8, the silent chain can be the same chain as used in the first embodiment. As shown in FIG. 8, the sprocket 21bc has a plurality of teeth, which engage with the link teeth 13 of the silent chain 11 shown in FIG. 2. The teeth of the sprocket consist of teeth B and C, which are uniformly positioned about the circumference of the sprocket so that the angle between radial centerlines for each pair of successive teeth of the sprocket is uniform.

Teeth B have a height 22bh and tooth surfaces 23b, having the shape of an involute curve. Teeth C have a height 22ch of tooth and tooth surfaces 23c also having the shape of an involute curve.

The height 22ch of the teeth C is slightly greater than the height 22bh of the teeth B. That is, 22ch>22bh. The teeth B and C are formed with a common tooth gap bottom diameter (root diameter) df. Thus, as seen in FIG. 8, the diameter dab of the tooth head circle of teeth b can be expressed as the sum of the common tooth gap bottom diameter df and twice the height 22bh of a tooth B. That is, dab=df+22bh×2. Likewise, the diameter dac of the tooth head circle of teeth C can be expressed as the sum of the common tooth gap bottom diameter df and the twice the tooth height 22ch of teeth C. That is, dac=df+22ch×2. As shown in FIG. 8, the diameter dac of the tooth head circle of teeth C is slightly larger than the diameter dab of the tooth head circle of teeth A. That is, dac>dab.

The shape of the tooth surfaces 23b and the shape of the tooth surface 23c are also different from each other.

In the manufacture of the sprocket, as a first step all the teeth are formed by a hob as large teeth C, having a tooth head diameter dac. Then, some, but not all, of the teeth C formed by the hob are milled by a milling machine to form a desired number of teeth B. The outer shape of the milling cutter used to form teeth B is different from the outer shape the cutting surface of the hob used in forming teeth C. As a result, the heights 22bh and 22ch of the respective teeth B and C are different, as are the shapes of the tooth surfaces 23b and 23c, and the sprocket has a two different kinds of teeth B and C, which can be randomly distributed about the circumference of the sprocket, as shown in FIG. 8.

By using different hobs and different milling cutters, the tooth forms of the two kinds of teeth B and C can be changed. The arrangement of the two kinds of teeth B and C can also be changed, and the arrangement shown in FIG. 8 is one example of numerous possible arrangements of teeth B and C.

When the sprocket 21*bc* is rotated clockwise, the silent chain 11 starts engagement with the sprocket by engagement of inner flanks 13*a* (FIG. 2) of the chain teeth with teeth B and C of the sprocket. As the chain moves around the sprocket, the chain becomes seated on the sprocket teeth with the inner flanks, or the outer flanks, in contact with the sprocket teeth. On a series of sprocket teeth B, the outer flanks 13*b* of the teeth of a link plate can be seated at two seating points tb, as shown in FIG. 5. On a series of sprocket teeth C only the inner flanks of the link plate become seated, at two seating points tc, as shown in FIG. 7. Since the sprocket has two kinds of teeth B and C, with different tooth forms and different tooth heights, seating contact between the flanks and the sprocket teeth occurs at different times for sprocket teeth B and C, and, as a result of the shift in seating timing, noises occurring on seating engagement are reduced.

As in the case of the first and second embodiment, since the sprocket 21*ac* of the second embodiment has two kinds of teeth B and C, having different tooth forms, the overall cost of the transmission can be lower than that of a silent chain transmission in which engagement timing is made irregular by providing two or more kinds of link plates in the chain, as in the prior art.

When the silent chain transmission device according to the third embodiment is used as a timing chain in an automobile engine, the different natural frequencies of different engines can be easily accommodated by changing the tooth forms of teeth B and C and changing the order of teeth B and C, thereby avoiding the effects of resonance.

Figure 9:
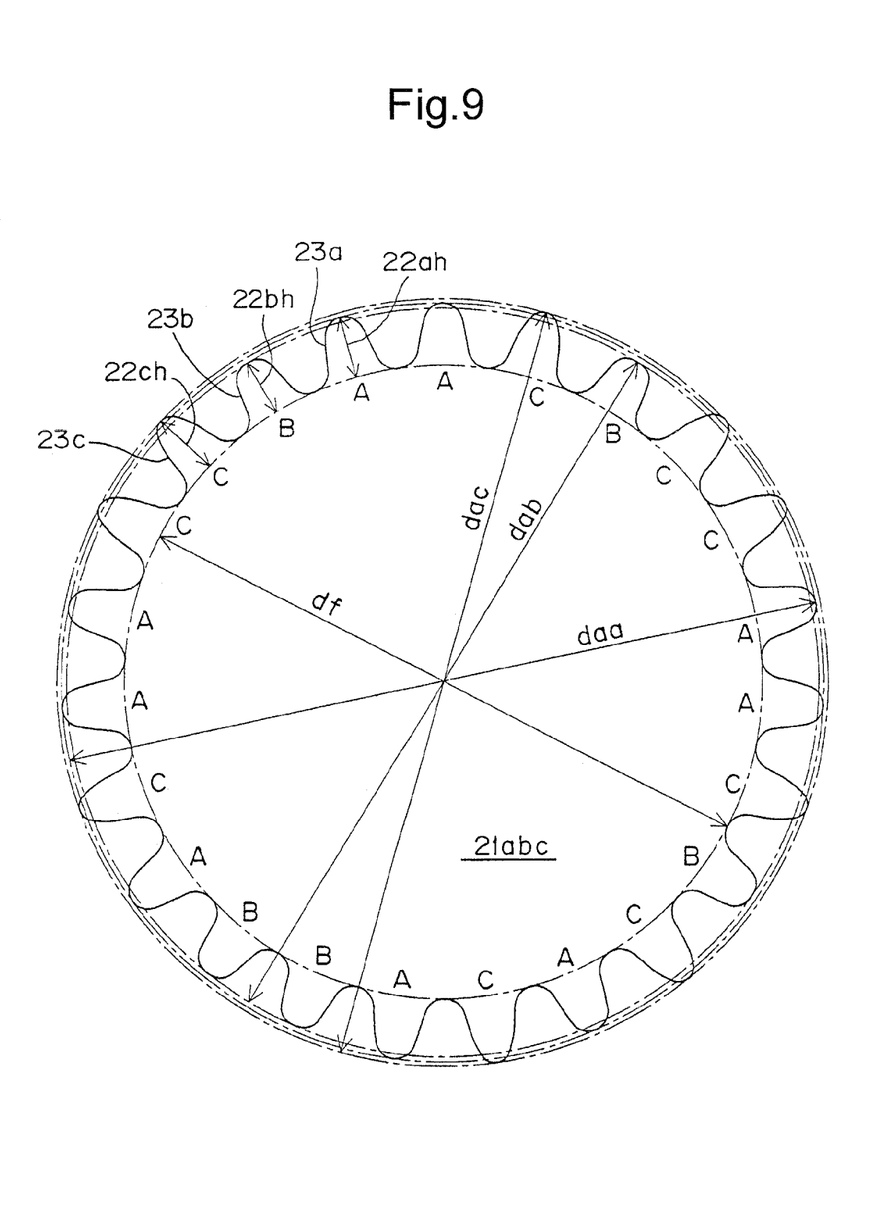
FIG. 9 is an elevational view of a sprocket in accordance with a fourth embodiment of the invention.
Figure 10:
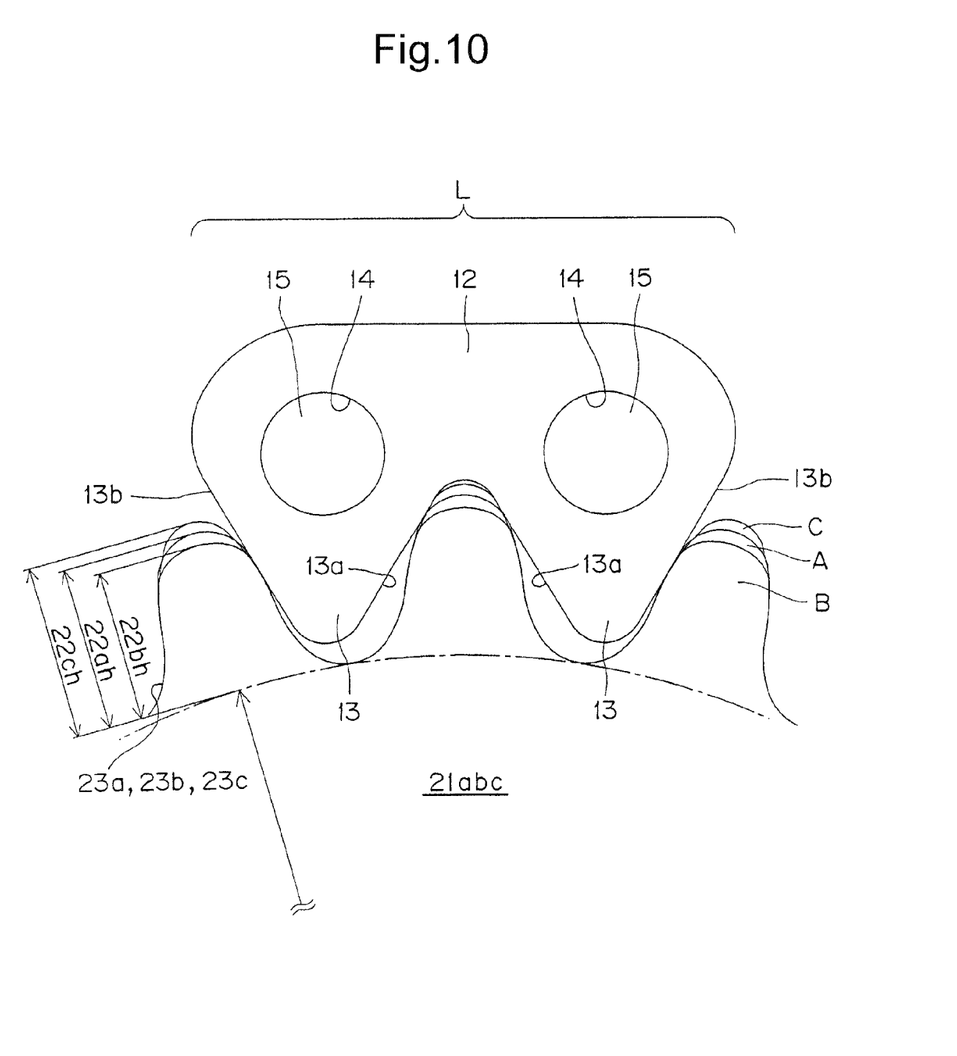
FIG. 10 is an enlarged schematic view in which the seating relationships of a link plate to each of three different kinds of sprocket teeth are compared.

In the embodiment of the invention shown in FIGS. 9 and 10, the silent chain can be the same chain as used in the first embodiment.

As shown in FIG. 9, the sprocket 21*abc* has a plurality of teeth, which engage with the link teeth 13 of the silent chain 11 shown in FIG. 2. The teeth of the sprocket consist of three kinds of teeth A, B and C, which are uniformly positioned about the circumference of the sprocket so that the angle between radial centerlines for each pair of successive teeth of the sprocket is uniform.

Teeth A have a height 22*ah* and tooth surfaces 23*a*, having the shape of an involute curve. Teeth B have a height 22*bh* and tooth surfaces 23*b*, having the shape of an involute curve. Teeth C have a height 22*ch* of tooth and tooth surfaces 23*c*, also having the shape of an involute curve.

The height 22*ch* of the teeth C is slightly greater than the height 22*ah* of teeth A, and the height 22*ah* of teeth A is slightly greater than the height 22*bh* of teeth B. That is, $22ch > 22ah > 22bh$.

The teeth A, B and C are formed with a common tooth gap bottom diameter (root diameter) df. As seen in FIG. 9, the diameter daa of the tooth head circle of teeth A can be expressed as the sum of the common tooth gap bottom diameter df and twice the height 22*ah* of a tooth A. That is, $daa = df + 22ah \times 2$. The diameter dab of the tooth head circle of teeth B can be expressed as the sum of the common tooth gap bottom diameter df and the twice the tooth height 22*bh* of teeth B. That is, dab=df+22*bh* H 2. Likewise, the diameter dac of the tooth head circle of teeth C can be expressed as the sum of the common tooth gap bottom diameter df and the twice the tooth height 22*ch* of teeth C. That is, $dac = df + 22ch \times 2$. Therefore, the diameter dac of the tooth head circle of teeth C is slightly larger than the diameter daa of the tooth head circle of teeth A, and the diameter of the tooth head circle of teeth A is slightly larger than the diameter dab of the tooth head circle of teeth B. That is, $dac > daa > dab$.

The shape of the tooth surface 23*a*, 23*b* and 23*c* are also different from one another.

In the manufacture of the sprocket 21*abc*, as a first step all the teeth are formed by a hob as large teeth C, having a tooth head diameter dac. Then, some, but not all, of the teeth C formed by the hob are milled by a milling machine to form a desired number of teeth A. The outer shape of the milling cutter used to form teeth A is different from the outer shape the cutting surface of the hob used in forming teeth C. Next, another group of large teeth C is cut by a milling cutter to form a desired number of teeth B. The milling cutters used to form the teeth A and B are different from each other and have a shape different from the shape of the hob used to form teeth C. As a result, the heights 22*ah*, 22*bh*, and 22*ch* of the respective teeth A, B and C are different, as are the shapes of the tooth surfaces 23*a*, 23*b* and 23*c*, and the sprocket has a three different kinds of teeth A, B and C, which can be randomly distributed about the circumference of the sprocket, as shown in FIG. 9.

By using different hobs and different milling cutters, the tooth forms of the three kinds of teeth A, B and C can be changed. The arrangement of the different kinds of teeth A, B and C can also be changed, and the arrangement shown in FIG. 9 is one example of numerous possible arrangements of teeth A, B and C.

When the sprocket 21*abc* is rotated clockwise, the silent chain 11 starts engagement with the sprocket by engagement of inner flanks 13*a* (FIG. 2) of the chain teeth with teeth A, B and C of the sprocket. As the chain moves around the sprocket, the chain becomes seated on the sprocket teeth with the inner flanks and outer flanks (as in FIG. 4), the outer flanks (as in FIG. 5), or the inner flanks (as in FIG. 7), in contact with the sprocket teeth. Since the sprocket has three kinds of teeth A, B and C, having different tooth forms and different tooth heights, seating contact timing for the different tooth flanks differs as does the timing of transfer from inner flank contact to outer flank contact.

Further, as shown in FIG. 4, since the inner flanks 13*a* and the outer flanks 13*b* are simultaneously seated on four seating points ta on sprocket teeth A, seating loads are dispersed, stress is reduced, and the seating impact force is reduced, thereby reducing the noise level.

Since the sprocket 21*abc* of the fourth embodiment has three kinds of teeth A, B and C, having different tooth forms, the overall cost of the transmission can be lower than that of a silent chain transmission in which engagement timing is made irregular by providing two or more kinds of link plates in the chain, as in the prior art.

When the silent chain transmission device according to the second embodiment is used as a timing chain in an automobile engine, the different natural frequencies of different engines can be easily accommodated by changing the tooth forms of teeth A, B and C and changing the order of teeth A, B and C, thereby avoiding the effects of resonance.

FIG. 10 shows schematically how a link plate of the silent chain can seat on sprocket teeth A, B and C. In the case of a high sprocket tooth C, seating takes place on the inner flanks, and in the case of a low sprocket tooth B, seating takes place on the outer flanks. Seating can take place on both the inner flanks and the outer flanks in the case of a sprocket tooth A having an intermediate height. Other combinations of inner flank seating and outer flank seating can occur with a given link plate, depending on the order and arrangement of sprocket teeth.

Various modifications can be made to the transmission of the invention, For example, although link rows L of the silent chain 11 are connected by round connecting pins (i.e., pins having a circular cross section), the links of the chain can be connected instead by rocker pins.

What is claimed is:

1. A silent chain transmission comprising:
an endless silent chain composed of interleaved widthwise rows of link plates all having the same shape, each link plate having a pair of link teeth, each link tooth having an inner flank and an outer flank, and a pair of pin holes, and connecting pins extending through the pin holes and connecting the interleaved rows of link plates whereby the link plates of each row are pivotable relative to the link plates of an adjacent row interleaved therewith; and
a sprocket having a plurality of sprocket teeth disposed equiangularly around the circumference of the sprocket, said teeth having a common bottom circle diameter and engaging with flanks formed on the link teeth of the silent chain, the silent chain transmitting power by initiating engagement with the sprocket teeth of the sprocket by inner flanks of the teeth of the silent chain;
said sprocket teeth being formed into two kinds of tooth shapes by varying heights and shapes of the sprocket teeth so that one kind of teeth seat inner and outer flanks of the teeth of the chain at the same time, and the other kind of teeth seat only outer flanks of the teeth of the chain.

2. A silent chain transmission comprising:
an endless silent chain composed of interleaved widthwise rows of link plates all having the same shape, each link plate having a pair of link teeth, each link tooth having an inner flank and an outer flank, and a pair of pin holes, and connecting pins extending through the pin holes and connecting the interleaved rows of link plates whereby the link plates of each row are pivotable relative to the link plates of an adjacent row interleaved therewith;
a sprocket having a plurality of sprocket teeth disposed equiangularly around the circumference of the sprocket, said teeth having a common bottom circle diameter and engaging with flanks formed on the link teeth of the silent chain, the silent chain transmitting power by initiating engagement with the sprocket teeth of the sprocket by inner flanks of the teeth of the silent chain;
said sprocket teeth being formed into two kinds of tooth shapes by varying heights and shapes of the sprocket teeth so that one kind of teeth seat inner and outer flanks of the teeth of the chain at the same time, and the other kind of teeth seat only inner flanks of the teeth of the chain.

3. A silent chain transmission comprising:
an endless silent chain composed of interleaved widthwise rows of link plates all having the same shape, each link plate having a pair of link teeth, each link tooth having an inner flank and an outer flank, and a pair of pin holes, and connecting pins extending through the pin holes and connecting the interleaved rows of link plates whereby the link plates of each row are pivotable relative to the link plates of an adjacent row interleaved therewith;
a sprocket having a plurality of sprocket teeth disposed equiangularly around the circumference of the sprocket, said teeth having a common bottom circle diameter and engaging with flanks formed on the link teeth of the silent chain, the silent chain transmitting power by initiating engagement with the sprocket teeth of the sprocket by inner flanks of the teeth of the silent chain;
said sprocket teeth being formed into two kinds of tooth shapes by varying heights and shapes of the sprocket teeth so that one kind of teeth seat only outer flanks of the teeth of the chain, and the other kind of teeth seat only inner flanks of the teeth of the chain.

4. A silent chain transmission comprising:
an endless silent chain composed of interleaved widthwise rows of link plates all having the same shape, each link plate having a pair of link teeth, each link tooth having an inner flank and an outer flank, and a pair of pin holes, and connecting pins extending through the pin holes and connecting the interleaved rows of link plates whereby the link plates of each row are pivotable relative to the link plates of an adjacent row interleaved therewith;
a sprocket having a plurality of sprocket teeth disposed equiangularly around the circumference of the sprocket, said teeth having a common bottom circle diameter and engaging with flanks formed on the link teeth of the silent chain, the silent chain transmitting power by initiating engagement with the sprocket teeth of the sprocket by inner flanks of the teeth of the silent chain;
said sprocket teeth being formed into three kinds of tooth shapes by varying heights and shapes of the sprocket teeth so that one kind of teeth seat inner and outer flanks of teeth of the chain at the same time, a second kind of teeth seat only outer flanks of the teeth of the chain, and a third kind of teeth seat only inner flanks of the teeth of the chain.

* * * * *